United States Patent [19]

Chaze et al.

[11] 4,095,495

[45] Jun. 20, 1978

[54] METHOD AND DEVICE FOR CUTTING A BUNDLE OF IRRADIATED NUCLEAR FUEL TUBES

[75] Inventors: Gilbert Chaze, Bourg-la-Reine; Guy Cherel, Le Vesinet; Rene Guilloteau, Verrieres-le-Buisson; Daniel Tucoulat, La Frette sur Seine, all of France

[73] Assignees: Commissariat a l'Energie Atomique, Paris; Saint-Gobain Techniques Nouvelles, Courbevoie, both of France

[21] Appl. No.: 720,060

[22] Filed: Sep. 2, 1976

[30] Foreign Application Priority Data

Sep. 11, 1975 France .................... 75 27896

[51] Int. Cl.² .............................................. B26D 7/08
[52] U.S. Cl. .......................................... 83/15; 83/170; 83/268; 83/277; 83/281
[58] Field of Search ............... 83/15, 170, 268, 277, 83/281

[56] References Cited

U.S. PATENT DOCUMENTS

| | | | |
|---|---|---|---|
| 2,362,722 | 11/1944 | Rush et al. | 83/170 X |
| 3,366,716 | 1/1968 | Cohen | 83/170 X |
| 3,621,742 | 11/1971 | Kendall | 83/281 X |

Primary Examiner—Willie G. Abercrombie
Attorney, Agent, or Firm—McNenny, Pearne, Gordon, Gail, Dickinson & Schiller

[57] ABSTRACT

This invention relates to a method and device for cutting a bundle of irradiated nuclear fuel tubes so as to cut the fuel into pieces of a suitable length for subsequent operation.

According to the invention the fuel tubes are moved from the storage pond by manipulating means to the store of the cutting machine. Means is provided for detecting the position of the bottom end of the bundle with respect to a cutting section in the cutter by means of a movable reference plate so as to enable the bundle to be moved to an operative position in which the first cut can be made in the immediate neighborhood of the base spigot. The arrangement also includes means for moving the bundle forwards while adjusting its position between two cutting operations.

14 Claims, 9 Drawing Figures

METHOD AND DEVICE FOR CUTTING A BUNDLE OF IRRADIATED NUCLEAR FUEL TUBES

The invention relates to a method and device for supplying a means for cutting irradiated nuclear fuel, the fuel being in the form of a bundle of tubes.

The invention relates to the first stage of reprocessing irradiated nuclear fuel, during which the bundles of tubes containing the nuclear fuel are cut into pieces having a suitable length for the subsequent operation, in which the fuel is dissolved inside the tubes. In the cutting operation, the bundle of tubes filled with nuclear fuel is usually sheared, since it is desired to reduce the resulting dust to a minimum; however, the supply device according to the invention is also applicable to cutting by means of a saw, laser, mill etc.

The device according to the invention relates more particularly to the withdrawal of bundles from the storage pond, the conveyance of a bundle in the cutter, and the feeding of the bundle into the cutter so that the successive cuts can be made and the spigots can be discharged.

A nuclear fuel bundle conventionally comprises several hundred tubes between 1 and 1.5 cm in diameter and several meters long, containing a nuclear fuel. The tubes are parallel and spaced apart by transverse spacers to form a square bundle having sides up to 30 cm. At each end of the bundle, the tubes fit into a spigot, the two spigots being inter-connected by longitudinal spacers. One spigot is called a base spigot and the other is called the top spigot. The top spigot has a part whereby the bundle can be gripped by an automatic gripper.

Owing to the high radioactivity of the fuel and the emission of radioactive dust and gas during cutting, work has to be carried out under remote control in a shielded, completely sealing-tight cell, and the device has to be vigorously ventilated to prevent the accumulation of radioactive dust and cool the part of the device surrounding the bundle.

In all industrial installations for cutting nuclear fuel, the bundle is vertical in the storage pond and is first gripped by a first manipulating means which inserts it into the cell and places it in a horizontal position. A second manipulating means is used to introduce the bundle into the cutter store, and a third movable means inside the store moves the bundle forward into the cutting means.

The main disadvantage of this complicated process is that long, expensive maintenance operations are required on bulky, complicated equipment, since the successive manipulations of the bundle increase the risk of faulty operation and radioactive contamination.

It has been proposed for the shearing-machine store to be made movable so as to reduce the distance travelled by the bundle in the cell, but this does not appreciably simplify the manipulating process and there are difficulties preventing industrial application.

The invention relates to a method and device for supplying a means for cutting a bundle of nuclear fuel tubes, the method and device using a movable store.

The method according to the invention for supplying a means cutting a bundle of nuclear fuel tubes, using a movable store, is characterised in that, in a first or "withdrawal" operation, the bundle is gripped in the storage pond by a manipulating means incorporated in the store of the cutting machine and completely introduced into the store, in a second or "bundle-position detection" operation, a movable reference plate is disposed near the end of the store adapted to come into contact with the cutter, the position of the plate being known relative to the store and to the cutting section in the cutter, after which the beam is moved until its end comes in contact with the reference plate, the reference plate is returned to its inoperative position, an "adjustment" operation is made on the position of the bundle so as to separate it from the base spigot, the operation consisting in moving the bundle out of the store for a given distance from the position of the bundle when in contact with the reference plate so as to separate the base spigot by cutting in the immediate neighbourhood thereof, and during a number of successive "cutting-position adjusting" operations the bundle is moved forward in the cutter by a length equal to the length of a tube portion, all the operations being carried out without the bundle being separated from the single manipulating means, which is incorporated in the store.

The device according to the invention is adapted to supply a means cutting a bundle of nuclear fuel tubes by means of a store which can move between at least two positions, a first position in which the bundle is introduced into the store and a second position in which the bundle is taken out of the store and cut in the cutter. The device comprises means, incorporated in the store, for withdrawing the bundle of tubes from a storage pond when the store is in the first position, means for moving the bundle in the store, means for detecting the position of the bottom end of the bundle with respect to a cutting section in the cutter by means of a movable reference plate disposed under the bundle for the detection operation, and means for adjusting the bundle in a new position, starting from the previously-mentioned position, so as to make the first cut in the immediate neighbourhood of the base spigot, and means for moving the bundle forwards while adjusting its position between two cutting operations.

Advantageously, the store is in the vertical position. Furthermore, the means for moving the bundle upward in the store, e.g. for inserting it into the store from the storage pond, and for moving it downwards for the detection operation, are the same (e.g. a pusher chain) as the means for moving the bundle forward between two cutting operations. Since a single manipulating means is used for all the movements of the bundle in the store, the process of manipulating the bundle is considerably simplified.

The position of the reference plate is known with respect to the cutting section of the cutter (e.g. a shearing machine). Thus, if the bottom end of the bundle is placed in contact with the reference plate, its position can be accurately detected and, starting from this position, it is easy to move the bundle through a given height, so as to position it for cutting. This is particularly advantageous when detaching the base spigots from the bundles without cutting the part of the tubes filled with nuclear fuel.

In a preferred embodiment, the device comprises abutments secured to a stationary frame on which the cutter is mounted, so as to provide a rigid connection between the store and frame. This method is particularly advantageous in the case where the cutter is a shearing machine, since the abutments limit the longitudinal movement of the store and bundle as a result of the forces acting on the bundle during its longitudinal motion, particularly when the bundle is sheared.

Since the store comprises two demountable parts, the cross-section of one part of the store can easily be adapted to the size of the bundle and the two parts can be separated in order to take out a damaged bundle which cannot be extracted by the means for moving the bundle in the store.

No operation is required for securing the store to the withdrawal station (corresponding to the first store position) or to the shearing-machine frame; this has the advantage of eliminating any cam or bolt securing means, thus greatly simplifying maintenance operations and increasing the reliability.

Since the bundle is usually stored vertically in the pond, it is also advantageous to dispose the store in a vertical position so that the bundle can be introduced therein, and to maintain the vertical position when supplying the cutter. In that case, the store can be rotated around a vertical axis or moved in a straight line. However, when the cutter is designed to receive the bundle in a horizontal or inclined position, rotation around a horizontal axis is necessary for moving the store from its vertical position on the bundle withdrawal station to its horizontal or inclined position for supplying the shearing machine.

The invention will now be described by way of example with reference to the accompanying drawings, in which.

Figure 1:
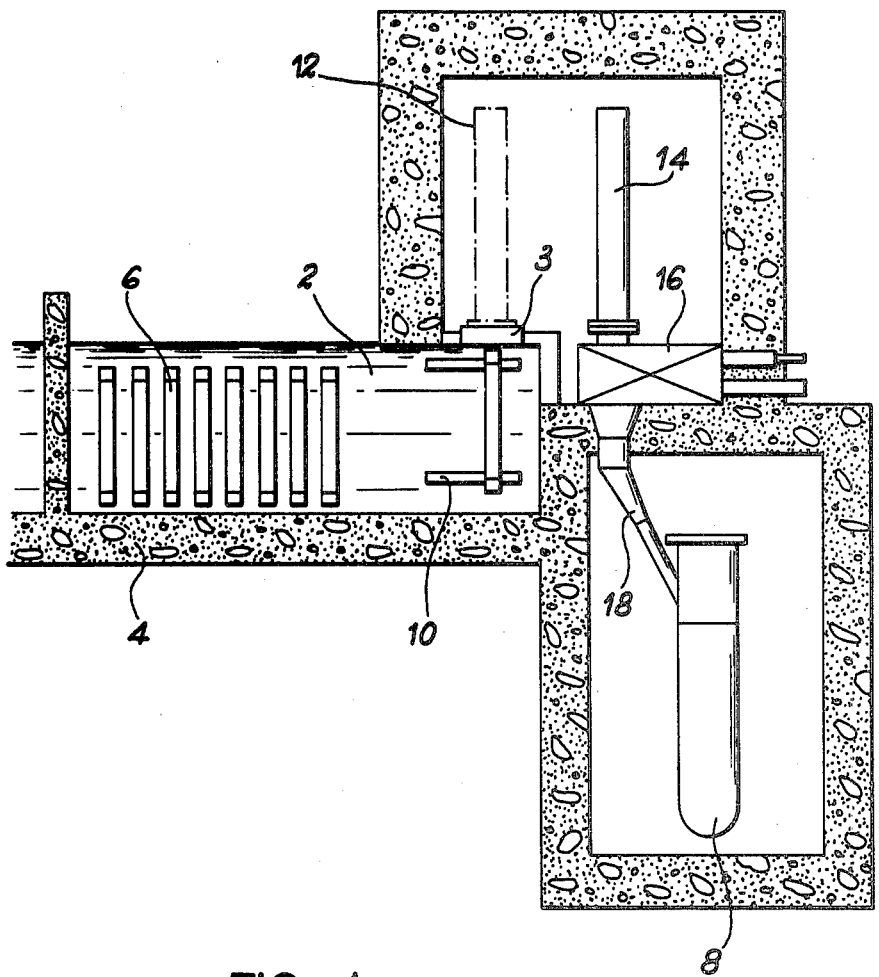
FIG. 1 is a general view of the device comprising a movable store according to the invention, in position near the storage pond.

FIG. 1 is a general view of the installation for supplying a cutter 16. Bundles of tubes filled with nuclear fuel are stored in a pond 2. A conveyor 10 places a bundle under a withdrawal station 3, the store being in a position 12 above station 3. The bundle is gripped by a manipulating means which is incorporated in the store and inserts it fully thereinto, after which the store containing the bundle is moved to 14 under the shearing machine 16. After being cut, portions of the bundle fall through a duct 18 into a dissolver 8. Usually, the store can serve other stations, not shown in FIG. 1, such as a gripper-washing station (preventing contamination of the pond water) or a station where the top spigot is released after cutting.

Figure 2:
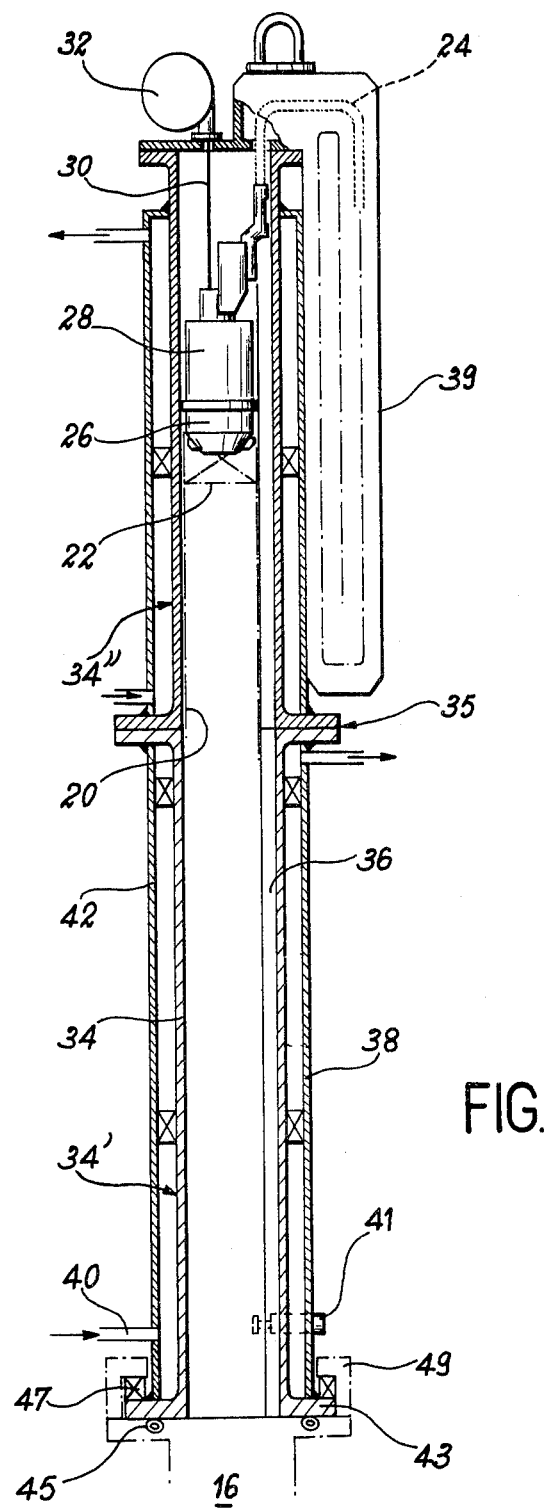
FIG. 2 is a diagram of the movable store according to the invention in side view.

FIG. 2 shows a store according to the invention adapted to receive a bundle of tubes 20 denoted by broken chain-dotted lines. In a preferred embodiment of the device according to the invention, the top spigot 22 of the bundle is moved by a pusher chain 24 which moves the bundle upwards or downwards. Spigot 22 is secured by a gripper 26 actuated by a conventional pneumatic jack 28 secured to the gripper. The jack is supplied by a flexible pipe 30 and a winder 32, the pipe being connectable to the jack by remote control. Chain 24 moves in store 34 along a guide rail 36. The chain is stored in a casing 39 in which it is held when gripper 26 and consequently the bundle is in the top position.

The chain is moved by a hydraulic or electric motor (not shown) which, for improved accessibility, can be placed outside the cell.

In the embodiment of the store shown in FIG. 2, the store is made up of two parts, a bottom part 34′ and a top part 34″. Parts 34′, 34″ are in line with one another and connected by flanges 35.

The top part 34″ comprises the previously-described manipulating means 24, 28, 26, 30, 32 and can be used for all kinds of bundles. The height of the bottom part 34′ is sufficient for it to hold the entire bundle when in position for the first cut and, each time the type of bundle is changed, the part 34′ containing the bundle during cutting is adapted to the dimensions of the new bundle, the clearance between part 34′ and the bundle being reduced to the minimum sufficient for the bundle to move in the store without the tubes containing the fuel being deformed or broken by the forces transmitted to the bundle in the longitudinal direction during cutting (shearing) and when the bundle moves forward between two cutting operations. In this embodiment, the two parts 34′, 34″ can be disconnected after securing the bundle in the bottom part of store 34′ by jacks 41. This is useful in the case of an accident during shearing, when it is necessary to evacuate the store so as to act on the shearing machine (or, more generally, the cutting device). In such cases the bundle has to be extracted from the shearing machine in which it is held, but if the top spigot of the bundle is pulled by the gripper, it may come loose from the tubes and thus interfere with subsequent manipulation of the bundle. Accordingly, operation is as follows. Bundle 20 is secured to the bottom part 34′ by locking it by a jack 41 or any equivalent locking device; the bundle is detached from gripper 26 which is then moved up entirely into the top part 34″, after which parts 34′, 34″ are separated and the top part 34″ is moved away from 34′.

The bottom part 34′ is secured to the top of the cell used for extracting the bundle from the shearing machine by tension applied to the bundle via part 34′ secured thereto.

The store is cooled by a flow of water 40 in a jacket 42 surrounding stores 34′, 34″ and casing 39, and also by scavenging with nitrogen (not shown) which also entrains nuclear fuel dust. Forces perpendicular to the horizontal cutting plane in FIG. 2 and transmitted during cutting to the store via the element and the pusher chain are absorbed by rollers or slides 47 secured to the base of store 34′ and bearing against abutments 49 secured to the cover of the shearing machine. Abutments 49 are removable so that the store can be dismantled when it is on the shearing machine and is prevented from moving normally owing to a damaged bundle.

The force-absorbing means prevents any stress being transmitted to the store support as a result of movement of the store, so that the store can be held in a constant position relative to the shearing machine.

Figure 3:
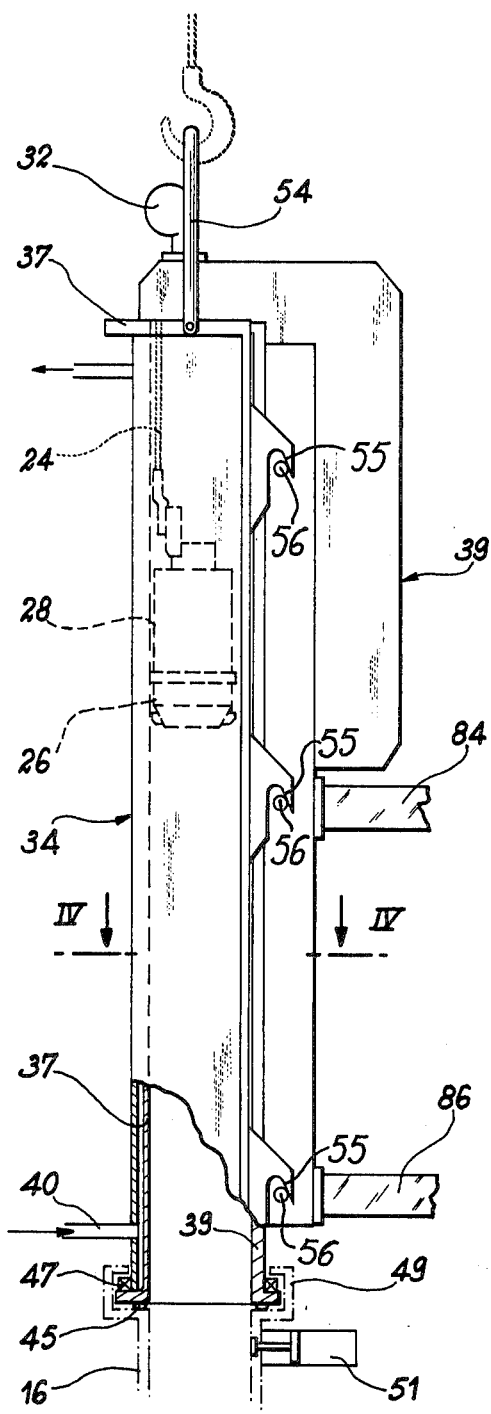
FIG. 3 is a diagram of a variant of the store in side view.

FIG. 3 shows a variant of the movable store comprising two parts, a first cylindrical U-shaped part 37 extending all the way along the store and a second part 39 having a flat surface bearing on the open part of the U-shaped part 37 over the entire length of the store, the flat surface being secured to the casing containing the pusher chain and other manipulating means, which are identical with those shown in FIG. 2 and denoted by the same references in FIGS. 2 and 3.

Whenever the type of bundle is changed, part 37 is changed so as to be adapted to the bundle dimensions, whereas the part 39 comprising the means for manipulating the bundle in the store is used for all types of bundles. It is simply necessary to raise part 37 by the top in order to separate it from part 39, which remains secured to the store-conveying means. When a part 37 is re-positioned, inclines 55 secured to 37 cooperate with lugs 56 secured to 39 to press the seal between 37 and 39 and ensure that the store is sealing-tight.

In the case shown in FIG. 3, the means for securing the bundle (jacks 51) are secured to the cover of the shearing machine. If, as a result of an accident during shearing, the store has to be evacuated so as to act upon the shearing machine, the bundle is secured in the shearing machine by jacks 51, after which gripper 26 is disconnected from the bundle and part 37 is gripped by the top of the cell so as to separate it from part 39, which can then be removed from the shearing machine by the device provided for moving the store between the cutting station and the station for withdrawing the bundle from the pond.

In the case shown in FIG. 3, the store has the same internal transverse dimensions all the way up, so that the rail for guiding the chain can be omitted. In that case, the store interior is completely smooth, thus reducing the risk of contaminating the store interior with radioactive dust. The gripper is then guided as shown in FIG. 6, where slides such as 96 bear against the four surfaces of the store whereas the pusher chain is pressed against one wall of the store so as to prevent it from being bent by the thrust.

Figure 4:
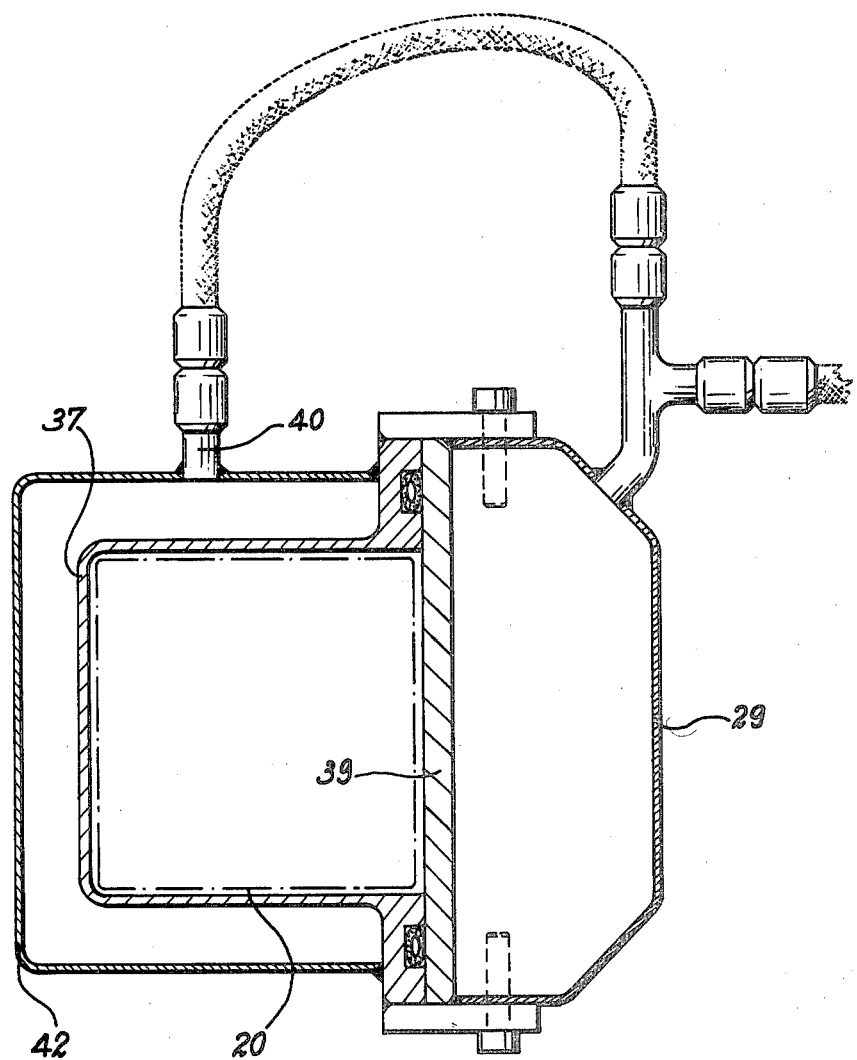
FIG. 4 is a diagram of the same store in plan view, in section along line IV—IV in FIG. 3.

FIG. 4 shows a cross-section IV—IV (FIG. 3) of the movable store in FIG. 3, showing the two parts of the movable store the independent water-cooling system on part 39 and the U-shaped part 37.

Figure 5:
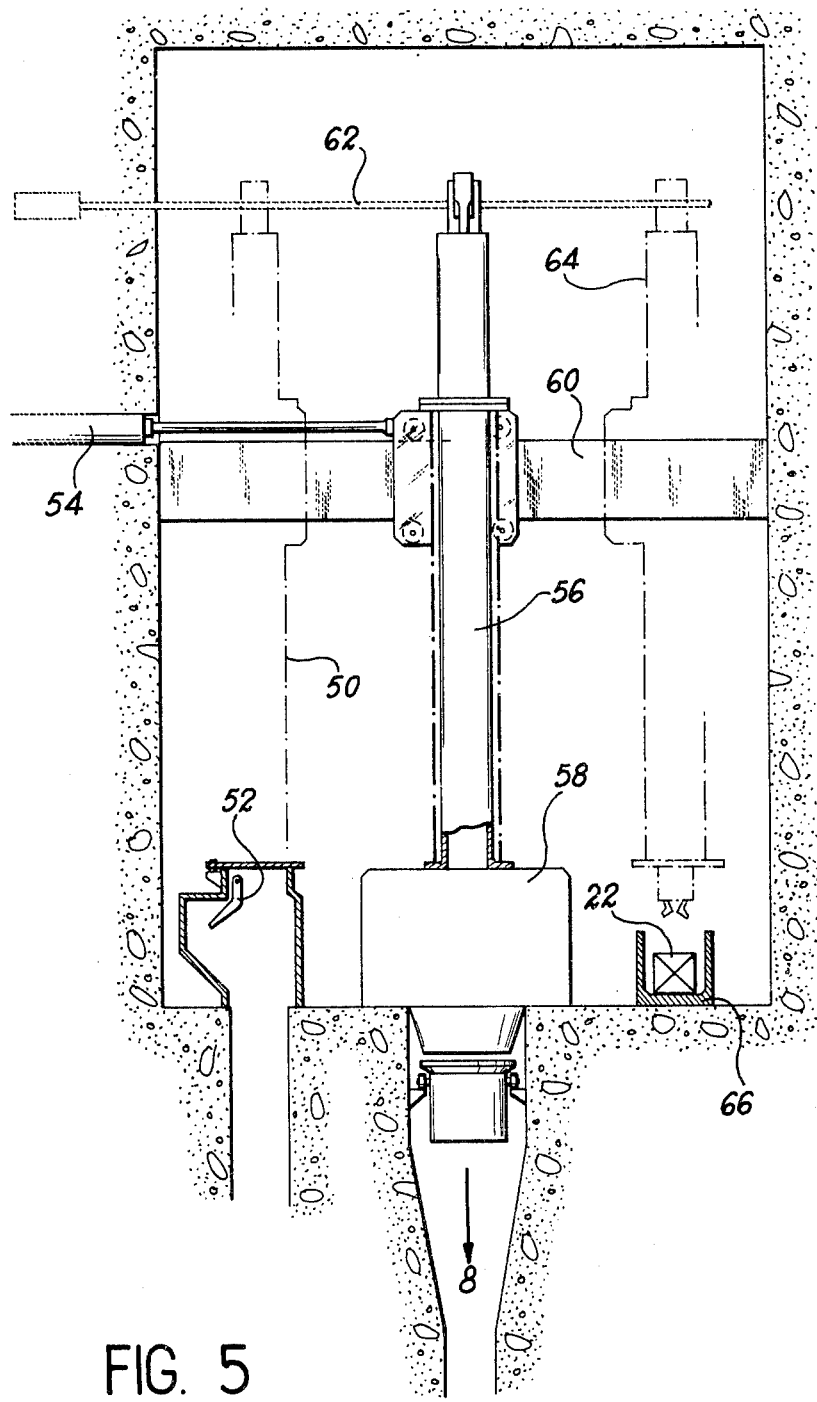
FIG. 5 shows a store movable in a straight line.
Figure 8:
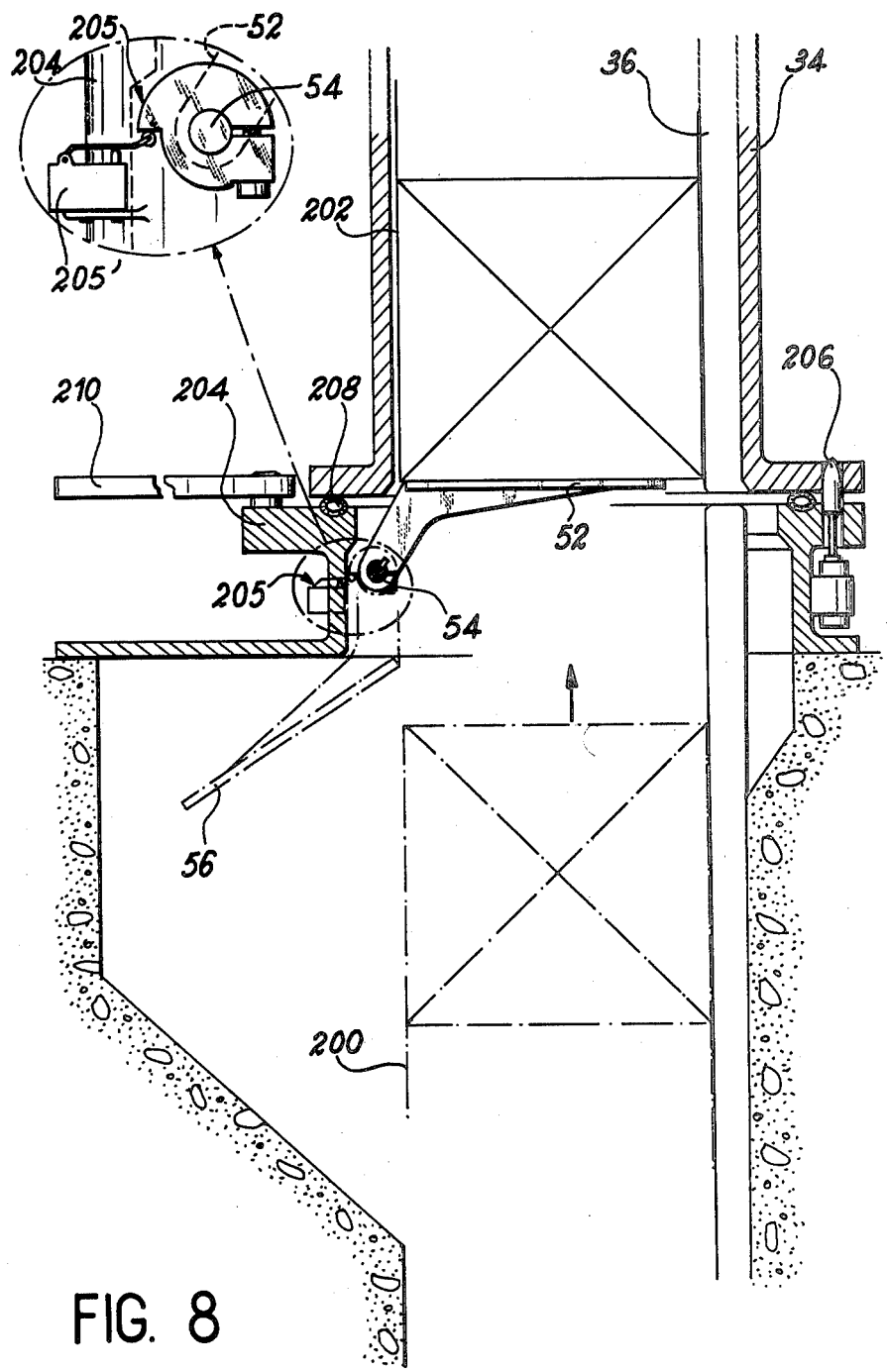
FIG. 8 shows the device according to the invention for adjusting the bottom of the bundle of tubes in the store.

FIG. 5 is a diagram of a movable store according to the invention in three positions — a first position 50 shown in broken chain-dotted lines in which the bundle is inserted into the store and the position of the bottom end of the bundle is adjusted by a reference plate or pallet 52 shown in greater detail in FIG. 8. Next, the store can be moved in line by a jack 54 up to a position 56, where the bundle is placed near a cutting means, e.g. a shearing machine 58. The movable store is guided in a straight line by rail 60. The pusher chain is actuated via a rod 62. In a third position 64, shown by broken chain-dotted lines, the store is disposed opposite a vessel 66 for holding the spigot 22, which is not to be sent into the dissolver.

Figure 6:
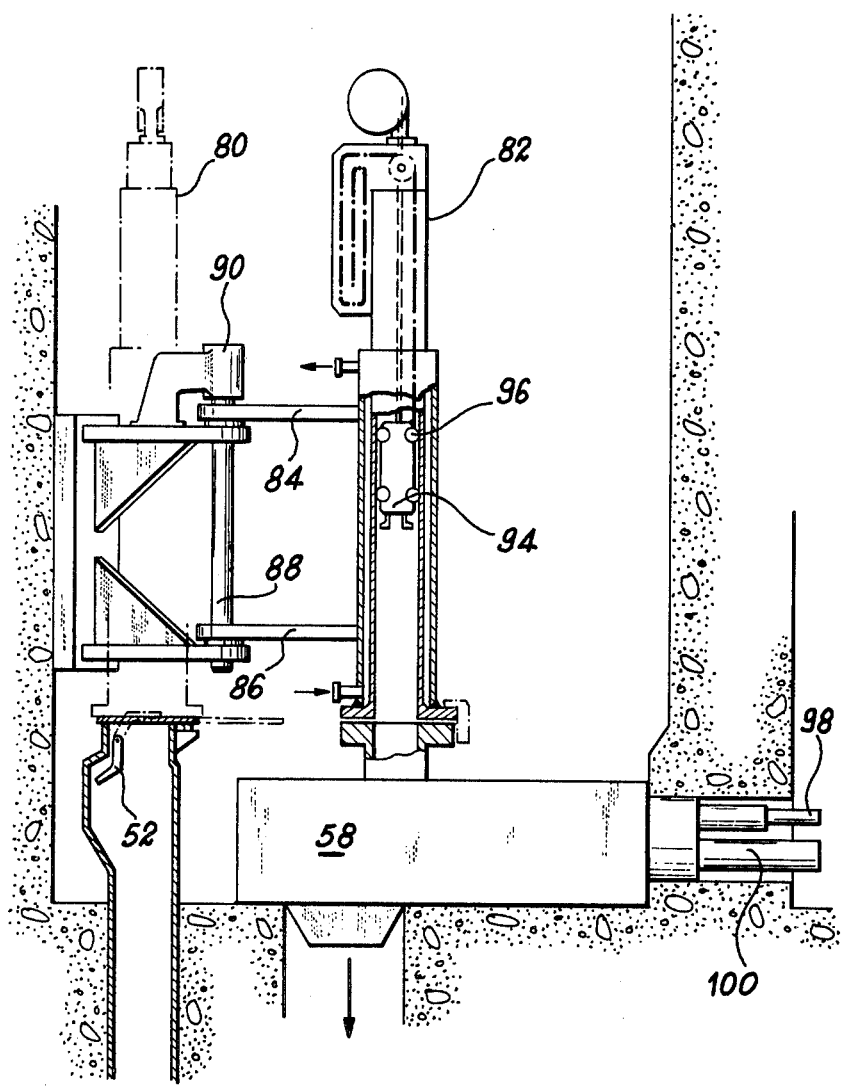
FIG. 6 shows a store movable between two positions by rotation.

FIG. 6 shows a preferred embodiment of the invention in which the movable store is rotated between two positions — a first position 80 shown in broken chain-dotted lines in which the bundle is inserted into the movable store and a second position 82 in which the same store is disposed near the cutting means (a shearing machine 58). The store has two arms 84, 86 perpendicular to the store body, the arms being pivoted around a shaft 88 by a motor 90. The gripper shown at 94 in FIG. 6 has slides 96 which move vertically and bear against the walls of the store, and the pusher chain is pressed against one wall of the store to prevent it bending under the thrust. In FIG. 6, reference 98 denotes the two jacks actuating the side-gripping means used for holding the bundle during the cutting operation, and reference 100 denotes the jack actuating the shears blade, an operation of the kind described in pending U.S. application Ser. No. 721,442, filed Sept. 8, 1976 in the name of the present inventors.

Figure 7:
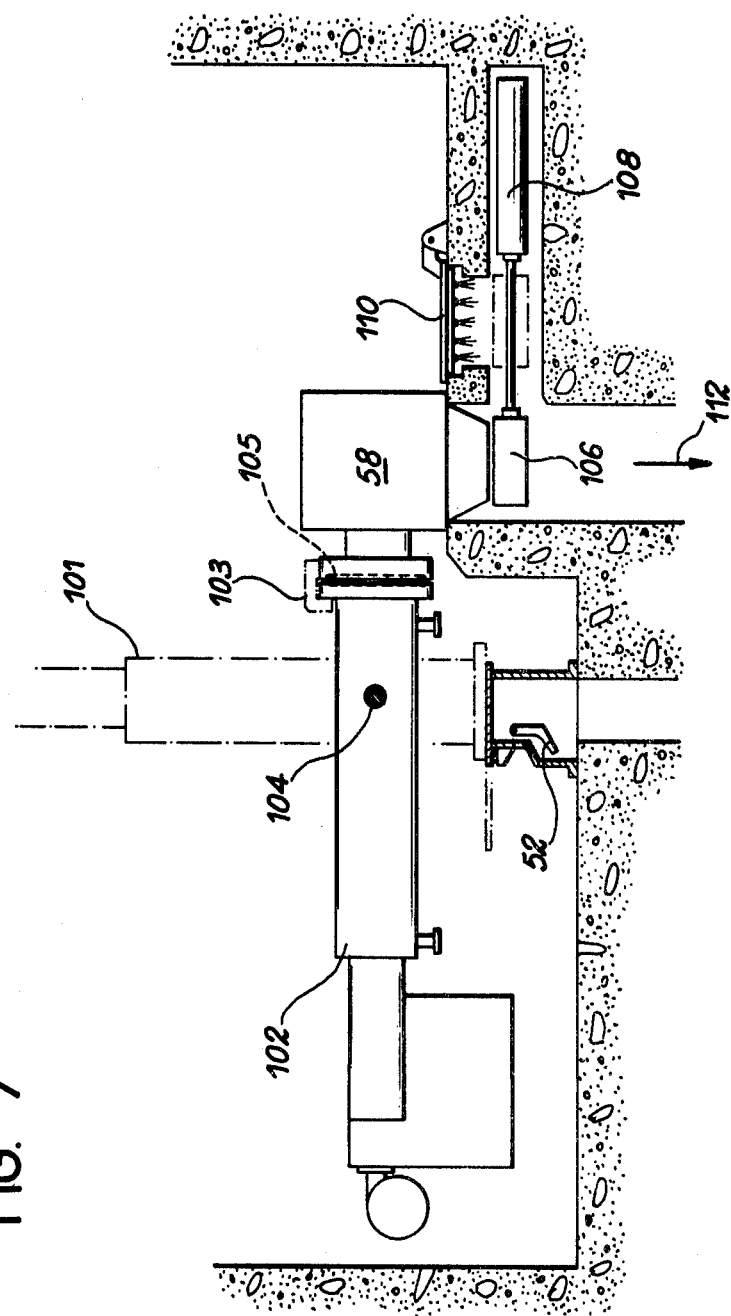
FIG. 7 shows a store movable between two horizontal and vertical positions.

FIG. 7 shows a movable store according to the invention pivotable around a horizontal axis between two positions, a vertical or loading position 101 and a horizontal or cutting position 102, the two positions being obtained by rotating the store around a shaft 104. In position 101, the bundle is suitably disposed by means of a pallet 52 shown in greater detail in FIG. 8.

The cutter (shearing machine) is at 58 and store 102 is connected to the cutter in the horizontal position. A store 106 movable by a jack 108 is used to collect the base spigots at the beginning of the cutting operation and the top spigots at the end of the cutting operation and place them under a washing system 110 instead of sending them to the dissolver along the direction marked by an arrow 112, along which the tube portions (other than the spigots) are sent after being cut at 58. A top or surface (not shown) is used for removing the spigot stored in store 106. Store 102 is secured to cutter 58 by abutments 103 integral therewith. Sealing-tightness is ensured by inflatable seals 105.

As in the embodiments shown in FIGS. 5 and 7, when the base spigot of an element to be cut is not sent to dissolver 8 it is necessary, in order to prevent fuel from being scattered, that when the base spigot is detached in the first cutting operation, an appreciable length of tubes filled with nuclear fuel is not cut at the same time, since the fuel would follow the spigot instead of going to the dissolver. Consequently, the top surface of the spigot must be brought as accurately as possible into the cutting plane of the shearing machine associated with the store. Since the height of the spigot and the position of the store with respect to the shearing machine are known, the base of the element can be accurately positioned in the store in order accurately to determine the distance for which the bundle is inserted into the shearing machine in order to detach the base spigot. The "zero" position on the base spigot is adjusted as shown in FIG. 8 when the store is in the loading position 12 (FIG. 1) using a reference plate 52 pivoting around a pigot 54. In the position shown in broken chain-dotted lines 56, the reference plate leaves sufficient room for inserting the bundle into store 34. When bundle 200 has been inserted into the store, plate 52 is placed horizontally under the bundle, which is then lowered to position 202 until it presses on to the reference plate and slightly rotates it, thereby also moving a sensor 205 likewise secured to spigot 54. The motion of sensor 205 is pneumatically or electrically detected by a means 205', which stops bundle 202 when its base is at a known position in store 34, the position being identical irrespective of the type of bundle. The sensor-detector assembly is shown in greater detail in the enlarged portion of FIG. 8.

Next, the store is moved by rotation or in a straight line to the shearing machine, where it is locked in a preset position such that the base of the elements can be adjusted in exact and reproducible manner with respect to the cutting plane. Store 34 is centred on a collar 204 by means of a retractable stud 206 and isolated from an external enclosure by inflatable seals 208. For greater security when store 34 is moved, a rotating plate 210 is disposed over the aperture of the withdrawal station in the pond.

Figure 9:
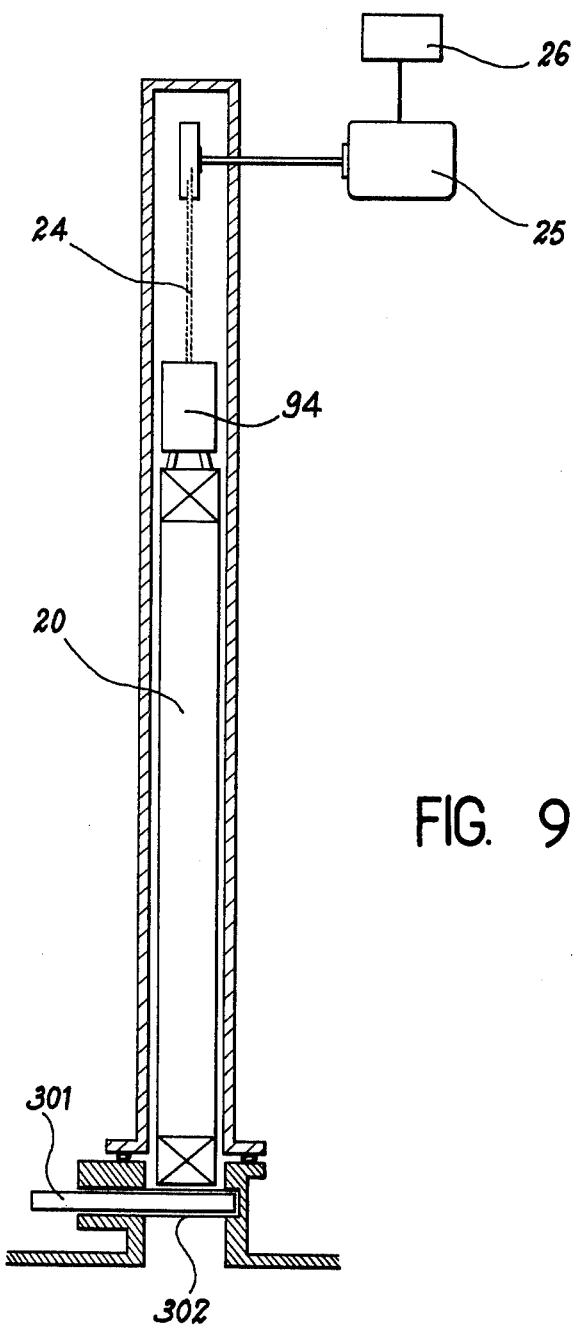
FIG. 9 shows a variant of the device for adjusting the bottom of the bundle.

The accompanying drawings show only pivoting reference plates, but sliding reference plates as shown at 301 in FIG. 9 could also be used.

A description will now be given of the entire process for accurately adjusting the successive positions of the bundle in the cutter (or shearing machine) with reference to all the accompanying drawings.

It will be remembered that it is important for the position of the bundle to be accurately adjusted for the first cut in the immediate neighbourhood of the base spigot.

For the purpose of withdrawal from the pond at the withdrawal station 3 in FIG. 1, the store is positioned by means of the retractable stud 206 in FIG. 8. A conveying bridge 10 moves the bundle under the withdrawal station 3 and raises it so that the part of the top spigot used for securing is withdrawn from the water, so that the store gripper does not contaminate the water. The gripper is lowered by the pusher chain guided by the prolongation of rail 36 shown in FIG. 8. The gripper grips the top spigot and raises the bundle in the store.

The reference plate 52 in FIG. 8 is horizontally disposed under the bundle. The bundle is lowered and, when it touches the reference plate, a pneumatic or electrical sensor indicates contact between the bundle and the reference plate. The sensor immediately stops the chain motor. The chain remains fixed with respect to the store until the position of the bundle is adjusted for the first cut in the shears. The store is moved into the cutter supply position and accurately secured on the cutter frame by a retractable stud. Since the position of the store relative to the reference plate 52 (FIG. 8) and relative to the cutting section of the cutter is known, an exact determination can be made of the motion of the pusher chain required for placing the bundle at the position for the first cut near the base spigot. Subsequently, further movements are actuated by the chain motor so as to position the bundle at all the successive places for obtaining tube portions of suitable length for dissolving in dissolver 8 (FIG. 1). After cutting, the top spigot is released and a new cycle can begin with a new bundle of tubes.

In a variant embodiment of the device for accurately detecting the base of the bundle in the store, contact between the base of the bundle and the reference plate is detected not by pivoting the reference plate but by the force exerted by the bundle on the reference plate, which is fixed. The appropriate device is shown in FIG. 9, which represents the withdrawal station 3 (FIG. 1). In FIG. 9, a reference plate 301 slides in slideways 302, plate 301 being positioned under a bundle 20 completely enclosed in the store. The bundle is lowered by a pusher chain 24 and a hydraulic motor 25, the pressure in the motor is measured by a pressure controller 26 and, when the pressure reaches a set value, motor 25 is automatically stopped, thus terminating the detection operation. The store can then be moved over the shears. Hitherto, we have described only devices for detecting the base of the bundle in the store, the means being mounted on the withdrawal station 3, but the detection device comprising a pivoting or sliding reference plate can also be mounted on the store or on the cutting station. When the cutter comprises a safety plate of the kind cited in the previously-mentioned U.S. application Ser. No. 721,442, for a shearing machine filed Sept. 8, 1976 by the present inventors, the safety plate advantageously takes the place of the reference plate.

In addition, in order to prevent the forces exerted on the store during cutting from being transmitted to the means for moving the store, the longitudinal, e.g. vertical, movements of the store can be made independent of the store-moving device, e.g. the slide in FIG. 5 or the rotating arms 84, 86 in FIG. 6. For this purpose, the store has vertical slideways enabling it to slide upwards without transmitting its thrust to the conveying device.

We claim:

1. A method of cutting a bundle of nuclear fuel tubes comprising the steps of gripping by means of a manipulator a bundle of vertically oriented nuclear fuel tubes having a base spigot and a top spigot, said bundle being disposed in a storage pond, completely introduced said bundle and said manipulator into a store, contacting and positioning said bundle with and relative to a movable reference plate disposed adjacent to an end of said store adapted to come into contact with a cutter, the position of said plate being known relative to said store and said cutter, retracting said reference plate into a non-contacting position with said bundle, moving said store until said end is adjacent and in contact with said cutter moving said bundle out of said store in steps of predetermined distance, cutting said base spigot from said bundle, cutting said bundle less said top spigot into predetermined portions, said manipulating means within said store continuously gripping said bundle during said moving and cutting.

2. A device for cutting a bundle of nuclear fuel tubes comprising a store movable between at least a first position in which a bundle of vertically oriented tubes having a base spigot and a top spigot is introduced from a storage pond into said store and a second position in which said bundle is taken out of said store in predetermined steps so as to be cut by a cutter mounted on a stationary frame, means incorporated within said store for withdrawing said bundle of tubes from said storage pond and into said store when said store is in said first position, means for moving said bundle within said store, means for detecting the position of the bottom end of said bundle with respect to said cutter, said means for detecting including a movable reference plate adoped to be diposed under said bundle, means for retracting said reference plate to a protected position during a cutting operation, means for moving said bundle from said detected position to another position wherein said cutter makes a first cut of said bundle in the immediate neighbourhood of said base spigot, and means for moving said bundle toward said cutter for subsequent cutting operations.

3. A device according to claim 2 wherein said reference plate moves between a vertical position and a horizontal position, said reference plate being disposed at the bottom end of said store, said means for detecting including a contractor indicating contact between said bundle and said reference plate when said reference plate is in said horizontal position.

4. A device according to claim 2 wherein said reference plate slides about an axis parallel to the direction of movement of said bundle said means for detecting including means for measuring the force exerted on the bundle when it is in contact with said sliding plate.

5. A device according to claim 2 including abutments secured to said stationary frame on which said cutter is mounted, said abutments being adapted to produce a rigid mechanical connection between said store and said frame.

6. A device according to claim 2 wherein said store comprises a top part including said means for manipulating the bundle inside said store and a bottom cylindrical part bounding a suitable space for moving said bundle therein, said top and bottom parts being secured together in operation, said bottom part further including means for locking said bundle in position within said bottom part of said store.

7. A device according to claim 2 wherein said store comprises a first part including a flat vertical surface extending along the longitudinal dimension of said store, said first part further including means for manipulating the bundle within said store, and a second part having a generally vertical U-shaped portion extending along the longitudinal dimension of said store, said second part cooperating with said first part to bound a space for moving said bundle therein, said two parts of said store being secured together in operation, said stationary frame secured to said cutter providing means for locking said bundle in position relative to said cutter.

8. A device according to claim 2 wherein said means for moving said bundle of tubes within said store includes a pusher chain.

9. A device according to claim 8 wherein said pusher chain is guided by a vertical rail.

10. A device according to claim 8 wherein said pusher chain is pressed against a wall of said store and said manipulator includes a gripper secured to said pusher chain said gripper being guided by the walls of the store.

11. A device according to claim 2 wherein said store can be moved by rotation about a vertical axis.

12. A device according to claim 2 wherein said store can be moved in a straight line.

13. A device according to claim 2 wherein said store can be moved around a horizontal axis.

14. A device according to claim 2 wherein said store has at least two independent cooling-water systems, each for a separate portion of said store.

* * * * *